United States Patent
Khambay et al.

(10) Patent No.: US 10,089,083 B2
(45) Date of Patent: Oct. 2, 2018

(54) SERVICE BROKER CODE GENERATOR

(71) Applicant: General Electric Company, Schenectady, NY (US)

(72) Inventors: Mandeep Khambay, San Ramon, CA (US); Param Pavar, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 15/378,579

(22) Filed: Dec. 14, 2016

(65) Prior Publication Data
US 2018/0165070 A1   Jun. 14, 2018

(51) Int. Cl.
G06F 9/44       (2018.01)
G06F 8/35       (2018.01)
G06F 9/54       (2006.01)

(52) U.S. Cl.
CPC .............. *G06F 8/35* (2013.01); *G06F 9/541* (2013.01)

(58) Field of Classification Search
None
See application file for complete search history.

(56) References Cited

U.S. PATENT DOCUMENTS

| 9,716,634 | B2* | 7/2017 | Sapuram | G06Q 30/0631 |
| 2007/0140150 | A1* | 6/2007 | Beck | H04L 65/1069 |
| | | | | 370/279 |
| 2012/0137307 | A1* | 5/2012 | Sarferaz | G06Q 10/10 |
| | | | | 719/317 |
| 2016/0283203 | A1* | 9/2016 | Li | G06F 17/3089 |

* cited by examiner

*Primary Examiner* — Philip Wang
(74) *Attorney, Agent, or Firm* — Buckley, Maschoff & Talwalkar LLC (57) ABSTRACT

Provided are a system and method for generating a service broker code for a service deployed on a cloud platform. In one example, the method includes generating service broker code for the service in which the generated service broker code includes built-in code that supports a plurality of operations of the service broker built and one or more gaps in the code corresponding to one or more operations of the service broker not supported by the built-in code thereby enabling customization of the service broker. The method further includes transmitting the generated service broker code to a user device associated with the service for filling in code for the one or more operations. Because gaps are left in the generated service broker code, the service broker can be customized by a developer of the service while incorporating already built-in code that has been tested and verified.

20 Claims, 6 Drawing Sheets

SERVICE BROKER CODE GENERATOR

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MM systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

Businesses can create competitive advantages by harnessing the power of data and services within a cloud computing environment to make better informed decisions. For example, services can accelerate insights into industry and healthcare by integrating big data, advanced metrics, and compelling visualizations in a tangible and intuitive software package. Industrial based and healthcare based services may be stored on the cloud platform as part of an Internet of Things (IoT). The services may be created by different vendors using different programming languages and may include different inputs, different outputs, and behave differently from each other.

Services are commonly integrated with a cloud computing environment by implementing an application programming interface (API) referred to as a service broker. In a typical implementation, the service broker acts as a hidden middle-man between the service and the cloud platform. As an example, a service broker may advertise a catalog of available service offerings and service plans, as well as interpreting calls for resources of the service. However, developing a service broker can be a difficult task even for developers who have significant knowledge in the field. There are very few resources for guiding developers on best practices or reference implementations. Moreover, service broker concepts can be even more difficult to grasp for a novice. Starting from scratch, a service broker can take weeks to develop and successfully be deployed and registered.

SUMMARY

In an aspect of an example embodiment, there is provided a computing device for generating a service broker for a service of a cloud platform, the computing device including a processor configured to generate service broker code for the service of the cloud platform, the generated service broker code including built-in code that supports a plurality of operations of the service broker and one or more gaps in the code corresponding to one or more operations of the service broker that are not supported by the built-in code thereby enabling customization of the service broker, and a network interface configured to transmit the generated service broker code to a user device associated with the service for filling in code for the one or more operations not supported by the code.

In an aspect of another example embodiment, there is provided a method for generating a service broker for a service of a cloud platform, the method including generating service broker code for the service of the cloud platform, the generated service broker code including built-in code that supports a plurality of operations of the service broker and one or more gaps in the code corresponding to one or more operations of the service broker that are not supported by the built-in code thereby enabling customization of the service broker, and transmitting the generated service broker code to a user device associated with the service for filling in code for the one or more missing operations.

In an aspect of another example embodiment, there is provided a computer readable medium having stored therein instructions that when executed cause a computer to perform a method for generating a service broker for a service of a cloud platform, the method including generating service broker code for the service of the cloud platform, the generated service broker code including built-in code that supports a plurality of operations of the service broker and one or more gaps in the code corresponding to one or more operations of the service broker that are not supported by the built-in code thereby enabling customization of the service broker, and transmitting the generated service broker code to a user device associated with the service for filling in code for the one or more missing operations.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings, in which.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a service broker code generator that creates a template for a service broker (i.e., an archetype) to be used in association with a cloud platform. The template provides a code base that allows even a novice to develop a service broker in a fraction of the time it takes an expert starting from scratch. The template includes code corresponding to a plurality of operations as well as gaps in the code that can be filled in by the service developer, operator, etc. The code supports the plurality of operations and may be tested and verified to work properly. Meanwhile, the gaps within the service broker code template provide a developer with the ability to customize the service broker. The service broker template captures the best practices for service broker development on the cloud platform and also promotes self-learning. In addition to providing a template, the service broker code generator may also provide instructions on how to fill-in the gaps and test the completed (i.e., filled-in) template. According to various embodiments, the service broker code template includes the benefits of code that is already verified and reliable while also including gaps in the remainder of the code allowing a developer to customize the service broker to their needs. A user that receives the service broker template and instructions can start a new service broker immediately and also save significant time when building the final version of the service broker.

The service broker archetype can be used by a user/developer that desires to implement a service broker on a cloud platform such as Cloud Foundry, and the like. The service broker archetype can be filled-in by a developer of a service to generate a finalized version of the service broker for a particular service. In general, a service broker is typically required within a cloud platform to provide for service discovery of the service, monetize the service, control access to the service in a cloud marketplace, and the like. A typical service broker for a service deployed on the cloud platform supports operations such as advertising a catalog of service offerings and service plans, interpreting calls for provision (i.e., create), bind, unbind, deprovision (i.e., delete), delivery of information to an application necessary for accessing service resources, and the like. It should also be appreciated that the service broker template described herein may be used with services that are deployed on an Internet of Things (IoT) platform and/or an Industrial Internet of Things (IIoT) platform.

While progress with machine and equipment automation has been made over the last several decades, and assets have become 'smarter,' the intelligence of any individual asset pales in comparison to intelligence that can be gained when multiple smart devices are connected together, for example, in the cloud. Assets, as described herein, may refer to equipment and machines used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

For example, an asset can be outfitted with one or more sensors configured to monitor respective operations or conditions. Data from the sensors can be recorded or transmitted to the cloud-based or other remote computing environment described herein. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, enhanced software algorithms for operating the same or similar assets, better operating efficiency, and the like. Examples of the software applications are described herein as analytics. Analytics may be used to analyze, evaluate, and further understand issues related to manufacturing. However, due to many possible factors, the performance of an analytic may decline over time. One such reason for this is due to unforeseen changes to the data (i.e., unexpected events). However, it should be appreciated that analytics may decline for any number of reasons.

In an example, an IIoT connects assets including machines and equipment, such as turbines, jet engines, hospitals, locomotives, and the like, to the Internet or cloud, or to each other in some meaningful way such as through one or more networks. The systems and methods described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function. The cloud may host and run various analytics having running instances that are accessible by authorized users of the analytic.

The Predix™ platform available from GE is a novel embodiment of an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights. One of the primary tools creating a better understanding of these assets are analytics.

Figure 1:
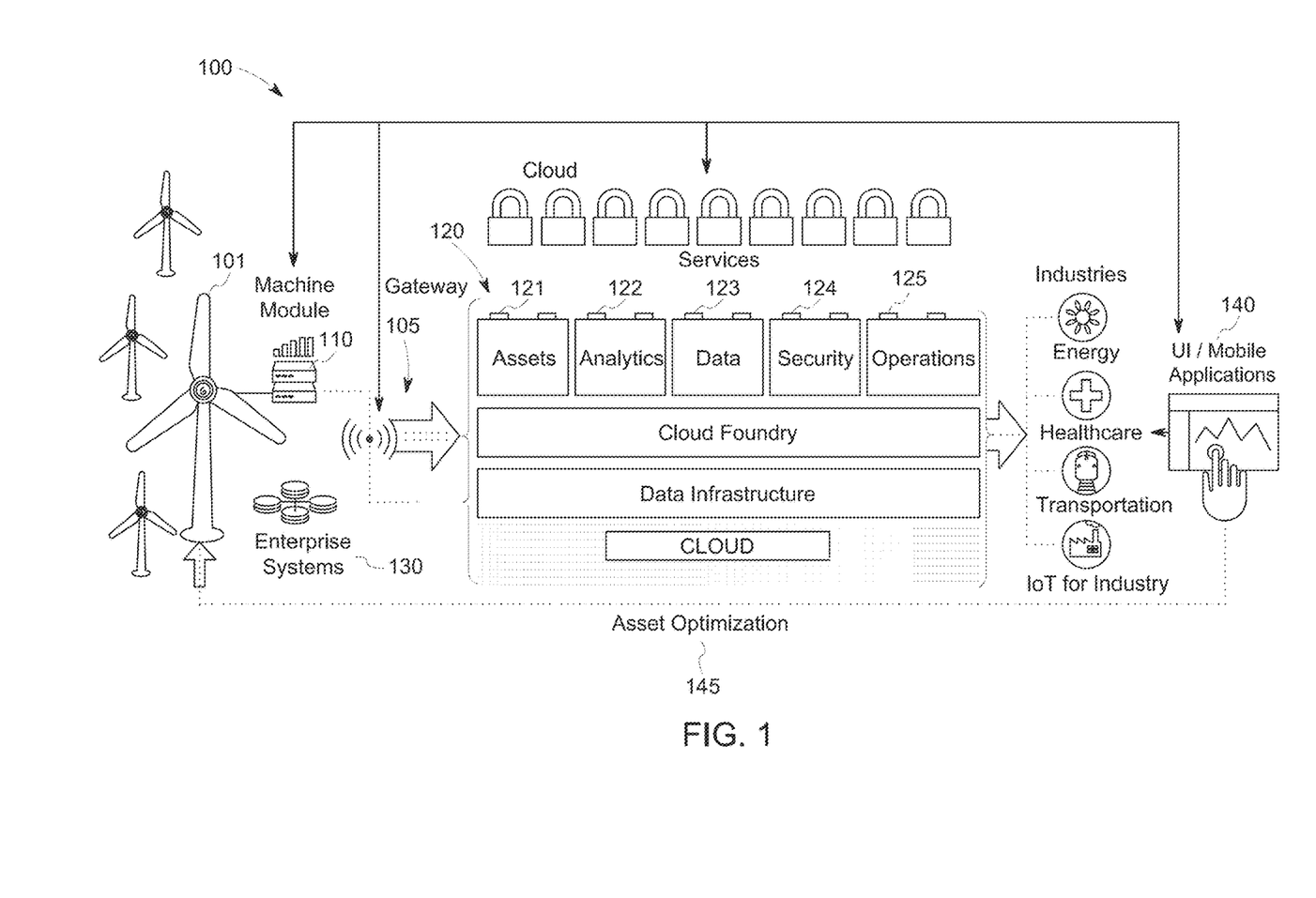
FIG. 1 is a diagram illustrating an example of a cloud computing platform in accordance with an example embodiment.

FIG. 1 illustrates a cloud computing environment associated with industrial systems in accordance with an example embodiment. FIG. 1 illustrates generally an example of portions of an asset management platform (AMP) 100. As further described herein, one or more portions of an AMP can reside in a cloud computing system 120, in a local or sandboxed environment, or can be distributed across multiple locations or devices. The AMP 100 can be configured to perform any one or more of data acquisition, data analysis, or data exchange with local or remote assets, or with other task-specific processing devices. The AMP 100 includes an asset community (e.g., turbines, healthcare machines, industrial, manufacturing systems, etc.) which are communicatively coupled with the cloud computing system 120. In an example, a machine module 110 receives information from, or senses information about, at least one asset member of the asset community, and configures the received information for exchange with the cloud computing system 120. The machine module 110 may be coupled to the cloud computing system 120 or to an enterprise computing system 130 via a communication gateway 105.

The communication gateway 105 includes or uses a wired or wireless communication channel that extends at least from the machine module 110 to the cloud computing system 120. The cloud computing system 120 may include several layers, for example, a data infrastructure layer, a cloud foundry layer, and modules for providing various functions. In the example of FIG. 1, the cloud computing system 120 includes an asset module 121, an analytics module 122, a data acquisition module 123, a data security module 124, and an operations module 125. Each of the modules may include or use a dedicated circuit, or instructions for operating a general purpose processor circuit, to perform the respective functions. According to various embodiments, the service broker code generator described herein may be stored on the cloud computing system 120 or externally and may provide a service broker code template to developers who want to deploy services on the cloud computing system 120 within the AMP 100. The services can be used by analytics and data that are also accessible by users of the cloud computing system 120.

An interface device 140 (e.g., user device, workstation, tablet, laptop, appliance, kiosk, and the like) can be configured for data communication with one or more of the machine module 110, the gateway 105, and the cloud computing system 120. The interface device 140 can be used to monitor or control one or more assets. As another example, the interface device 140 may be used to develop and upload services, data, and analytical applications to the cloud computing system 120. As yet another example, the interface device 140 may be used to access services, data, and analytical applications hosted by the cloud computing system 120. Information about the asset community may be presented to an operator at the interface device 140. The information about the asset community may include information from the machine module 110, or the information can include information from the cloud computing system 120. The interface device 140 can include options for optimizing one or more members of the asset community based on analytics performed at the cloud computing system 120. Prior to analytics being accessed through the cloud computing system 120, the cloud computing system 120 may certify the analytics.

FIG. 1 further includes the device gateway 105 configured to couple the asset community to the cloud computing system 120. The device gateway 105 can further couple the cloud computing system 120 to one or more other assets or asset communities, to the enterprise computing system 130, or to one or more other devices. The AMP 100 thus represents a scalable industrial solution that extends from a physical or virtual asset (e.g., the first wind turbine 101) to a remote cloud computing system 120. The cloud computing system 120 optionally includes a local, system, enterprise, or global computing infrastructure that can be optimized for industrial data workloads, secure data communication, and compliance with regulatory requirements.

The cloud computing system 120 can include the operations module 125. The operations module 125 can include services that developers can use to build or test Industrial Internet applications, and the operations module 125 can include services to implement Industrial Internet applications, such as in coordination with one or more other AMP modules. In an example, the operations module 125 includes a microservices marketplace where developers can publish their services and/or retrieve services from third parties. In addition, the operations module 125 can include a development framework for communicating with various available services or modules. The development framework can offer developers a consistent look and feel and a contextual user experience in web or mobile applications. Developers can add and make accessible their applications (services, data, analytics, etc.) via the cloud computing system 120. In order to assist the services when they are added to cloud computing system 120, the example embodiments may generate and provide a service broker code template to the developers. The service broker template code may include built-in code that supports functions/features that work with the cloud computing system 120 (e.g., catalog, binding, plan management, etc.) as well as gaps of code corresponding to operations that are not yet supported and that allow the developer to customize the service broker by filling in code for those operations.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120. A special emphasis may be placed on time series data, as it is the data format that most sensors use.

Security can be a concern for data services that exchange data between the cloud computing system 120 and one or more assets or other components. Some options for securing data transmissions include using Virtual Private Networks (VPN) or an SSL/TLS model. In an example, the AMP 100 can support two-way TLS, such as between a machine module and the security module 124. In an example, two-way TLS may not be supported, and the security module 124 can treat client devices as OAuth users. For example, the security module 124 can allow enrollment of an asset (or other device) as an OAuth client and transparently use OAuth access tokens to send data to protected endpoints.

Figure 2:
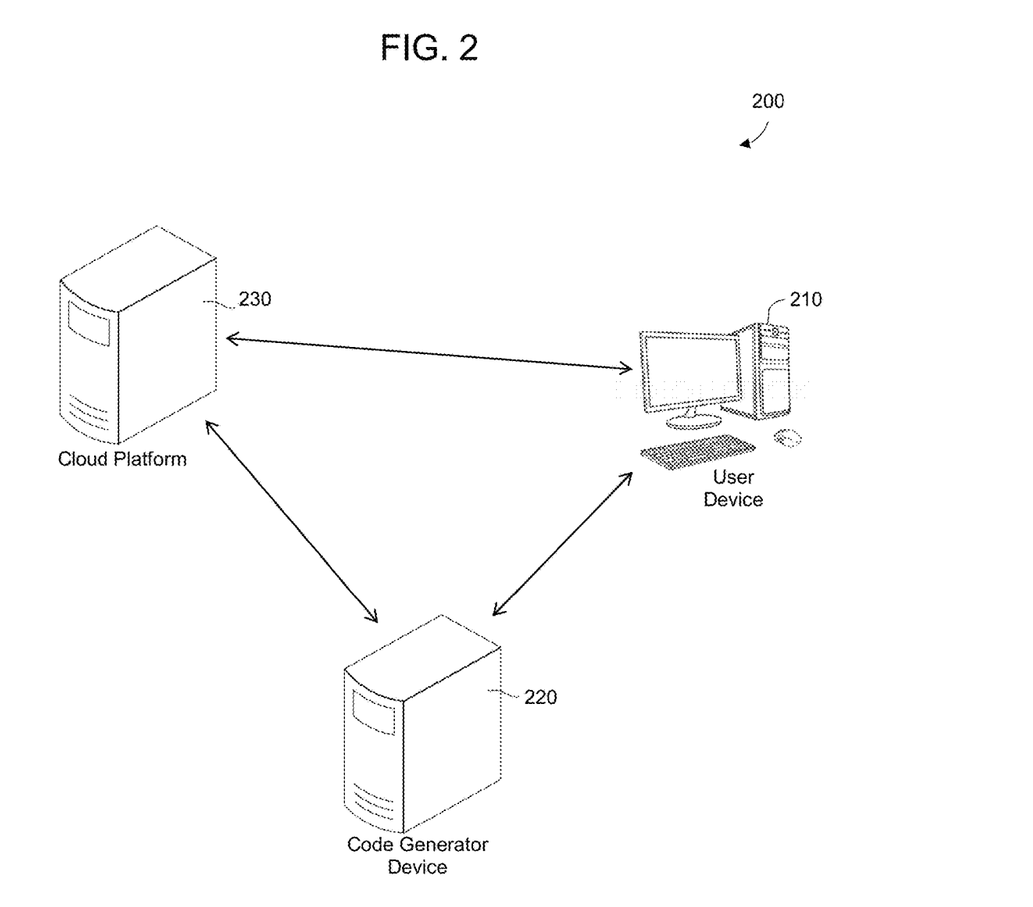
FIG. 2 is a diagram illustrating a system for generating a service broker for a cloud platform in accordance with an example embodiment.

FIG. 2 illustrates a system 200 for generating a service broker for a cloud platform in accordance with an example embodiment. The system 200 may be included within the system 100 shown in FIG. 1, or it may be a different system. Referring to FIG. 2, the system 200 includes a user device 210, a code generating device 220, and a cloud computing platform device 230. The user device 210 may be a device associated with a developer of a service that is to be or that is already deployed on the cloud platform 230. For example, the user device 210 may be a work station, a personal computer, a laptop, a tablet, a mobile phone, a server, and the like. The user device 210 may be used to develop and/or store the service as well as a service broker for the service. Developers and operators may be interested in creating and managing services for the cloud platform 230 which may be based on Cloud Foundry. The services may be integrated with the cloud platform 230 via application programming interfaces (APIs), and enable end users to provision reserved resources and credentials on demand. Examples of the types of services include services for monitoring, evaluating, and performing analytics on machine and equipment assets related to healthcare, manufacturing, transportation, energy, and the like, although the embodiments are not limited thereto.

According to various embodiments, the code generator device 220 may generate a template for a service broker of the service provided by user device 210 and deployed on the cloud platform 230. The user device may receive the template and finalize the template to generate a fully operational service broker for their respective service that may be used to handle communications and resource reservations between users of the cloud platform 230 and the service running on the cloud platform 230. The code generated for the service broker may include code for a plurality of operations that are supported by the service broker and which have been built into the code. Furthermore, the code may also include gaps (or missing code) intentionally left out of the generated code to enable a user (e.g., a designer, developer, operator, etc.) to customize the code for those operations/features. The code template may benefit users because the template includes built-in code that is already verified to work with the cloud platform 230. In other words, the operations that are supported by the code included in the template may be successfully tested and verified by the code generator device 220 with respect to the cloud platform 230 thereby providing reliable built-in functionality with the template that is provided to the user device 210.

The gaps within the service broker template allow a user to further customize the service broker, for example, based on their individual needs, the needs of their service, the needs of their clients, and the like. In addition to the template, the code generator device 220 may also generate instructions that may describe how to create the remaining service broker code, how to test and verify the filled-in code works with the built-in code, how to push the service broker to the cloud platform, how to register the service broker, and the like. The user device 210 may receive the template and the instructions for finishing the template from the code generator device 220. Accordingly, a user of the user device 210 may customize the code and generate a customized service broker through the user device 210. The customized service broker may be uploaded from the user device 210 to the cloud platform 230 in association with a service. When end users access the service via the cloud platform 230, the service broker can control the resources of the service that are provided to the user via the cloud platform 230.

Figure 3:
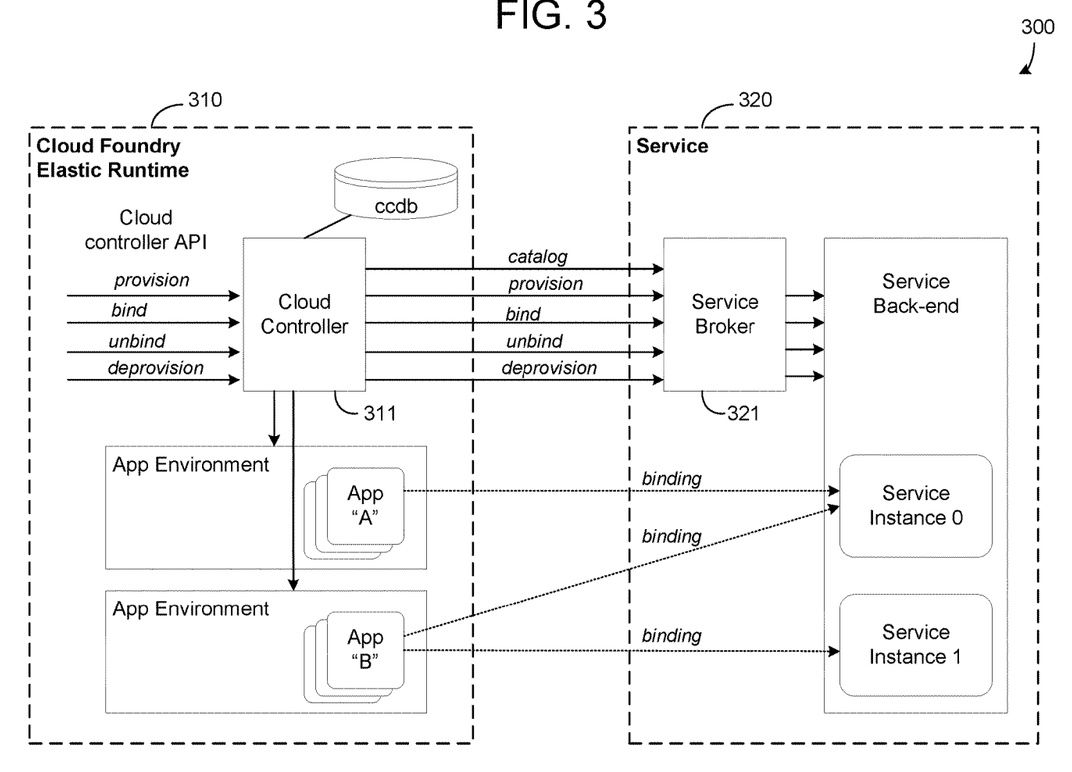
FIG. 3 is a diagram illustrating a communication process between a cloud platform and a service in accordance with an example embodiment.

FIG. 3 illustrates a communication process 300 between a cloud platform 310 and a service 320 in accordance with an example embodiment. In this example, the cloud platform 310 includes a cloud controller 311 and the service 320 includes a service broker 321 which communicates with the cloud controller 311 to provide resources of the service 320 to users of the cloud platform 310. The service 320 may be integrated with the cloud platform 320 by implementing a documented service broker API (service broker 321) of which the cloud controller 311 is a client. This should not be confused with the cloud controller API, often used to refer to the version of the cloud platform itself such as Cloud Foundry.

The service broker 321 may advertise a catalog of service offerings and service plans of the service, as well as interpreting calls for provision (create), bind, unbind, and deprovision (delete) of the resources. What the service broker 321 does with each call can vary between services. For example, provisioning may reserve resources of the service 320 and bind may deliver information to an application necessary for accessing the resource. The reserved resource may be referred to as a service instance. What a service instance represents can vary by service. For example, a service instance could be a single database on a multi-tenant server, a dedicated cluster, or even just an account on a web application. How the service 320 is implemented is up to the service provider/developer. The cloud platform 320 may require that the service provider implement the service broker 321. Also, the service broker 321 can be implemented as a separate application, or by adding Hypertext Transfer Protocol (HTTP) endpoints to an existing service.

Service broker development on a cloud platform (e.g., Cloud Foundry) requires implementing a few REST endpoints, additional setup to invoke Cloud Foundry operations, and a significant understanding of the benefits of a service broker and how to approach it. For example, a service broker requires a developer thereof to implement storage for service broker details (Instance, Binding, Catalog, etc.). There are very few resources available for guiding a designer on best practices of a message broker and there are very few reference implementations. Also, service broker concepts can be difficult to grasp for a novice. The example embodiments provide a service broker code template that promotes best practices by including built-in reliable code that has already been verified with the cloud platform as well as instructions for finalizing the code and testing the code locally.

Figure 4:
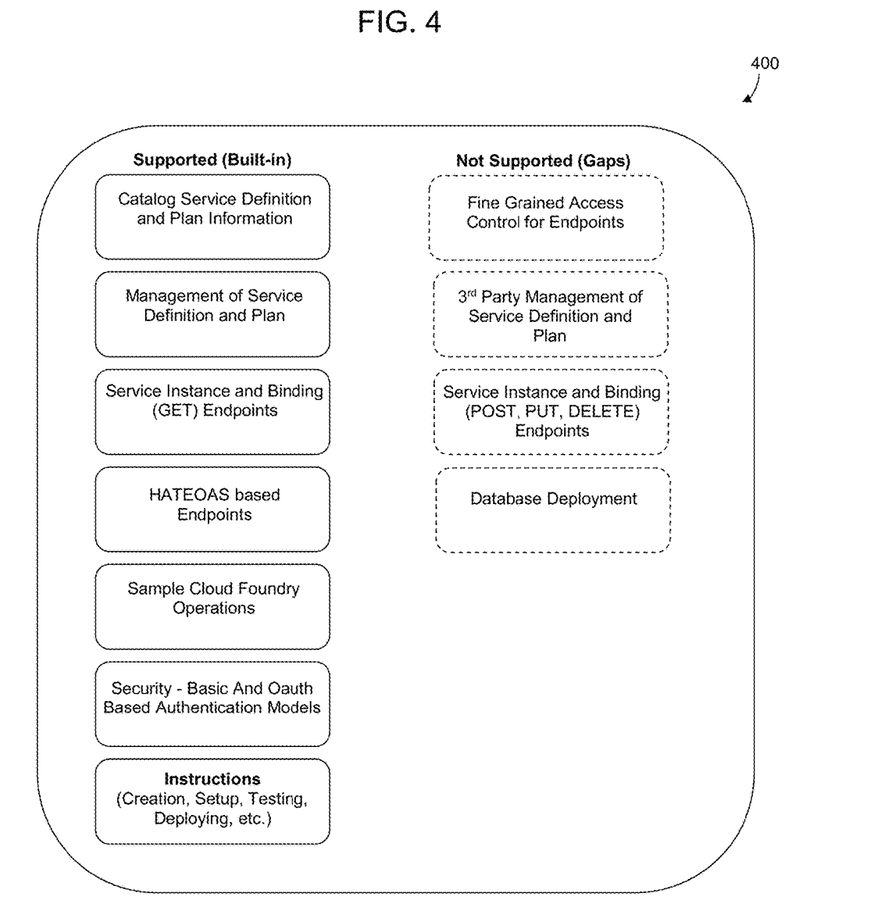
FIG. 4 is a diagram illustrating an example of a plurality of operations that may be supported by the code included in a generated service broker template in accordance with an example embodiment.

FIG. 4 illustrates a plurality of operations 400 that may be supported by the code of a service broker template and operations that may not be supported by the code, in accordance with an example embodiment. In the example of FIG. 4, the operations that are built into the template have a solid line around them, while operations that are not built into the service broker code template have a dashed line around them. It should appreciate that these operations/features are merely for purposes of example, and the template may include or may be missing other features/operations. In this example, some of the features that may be built into the service broker code template include the following.

Service Broker API implementation for Catalog, Service Instance, and Binding (e.g., using Spring Cloud Foundry Service Broker framework).

Catalog for Service Definition and Plan, Service Instance and Binding information.

Secured HATEOAS based REST endpoints for Service Definition, Plan, Service Instance and Binding. (HATEOAS is an abbreviation for Hypermedia As The Engine Of Application State, and is a constraint of the REST application architecture that distinguishes it from most other network application architectures. The principle is that a client interacts with a network application entirely through hypermedia provided dynamically by application servers).

Spring REST Docs (Ascii docs).

Sample Cloud Foundry Operations implementation. This can be extended to call other Command Line Interface (CLI) operations.

Java Config including Security (Authentication), OpenJPA setup, etc.

50+ units and repository tests that can be extended further.

Integration tests performed on the service broker deployed in the cloud space.

The infrastructure to run integration tests.

Code coverage posted to Clover (Clover is a Java Code Coverage Analysis application. Some features include historical reporting, huge control over the coverage gathering process, command line toolset and API for legacy integration and more).

Prepared and ready for CI/CD integration with required files.

A technical stack, for example, Spring 4.3, SpringRunner, Spring REST Docs, Java 8—Streams, Lambdas, Reactive Core—Reactive Programming.

Security—Supports both Basic and OAuth based authentication models.

It should be appreciated that these features are merely examples, and not requirements. In addition to the built-in features, the generated code may also include a plurality of customizable gaps that may be filled-in by a user. As a non-limiting example, some of the operations and/or features missing from the generated service broker code template may include:

Fine grained Access Control for REST endpoints (ACS) may be omitted from the service broker code template. The service broker template may provide authentication for the REST endpoints that cover the Service Definition, Plan, Service Instance and Binding information. However, a developer may additionally implement fine grained control over particular operations.

Service Definition and Plan information may be included in the service broker code template and it may suffice most use cases. However, a developer may desire to use a third party to manage plans. Accordingly, the service broker code template provides hooks/integration points to manage plans.

Service Instance and Binding information included in the service broker code template may include REST GET endpoints. However, if a developer wants to implement POST, PUT, and DELETE REST endpoints the developer may customize the service broker code.

Database deployment—the service broker code template may include SQL scripts that the developer can execute. However, the service broker code template may not include database (DB) management implementation tools and the developer may add them to the code.

Figure 5:
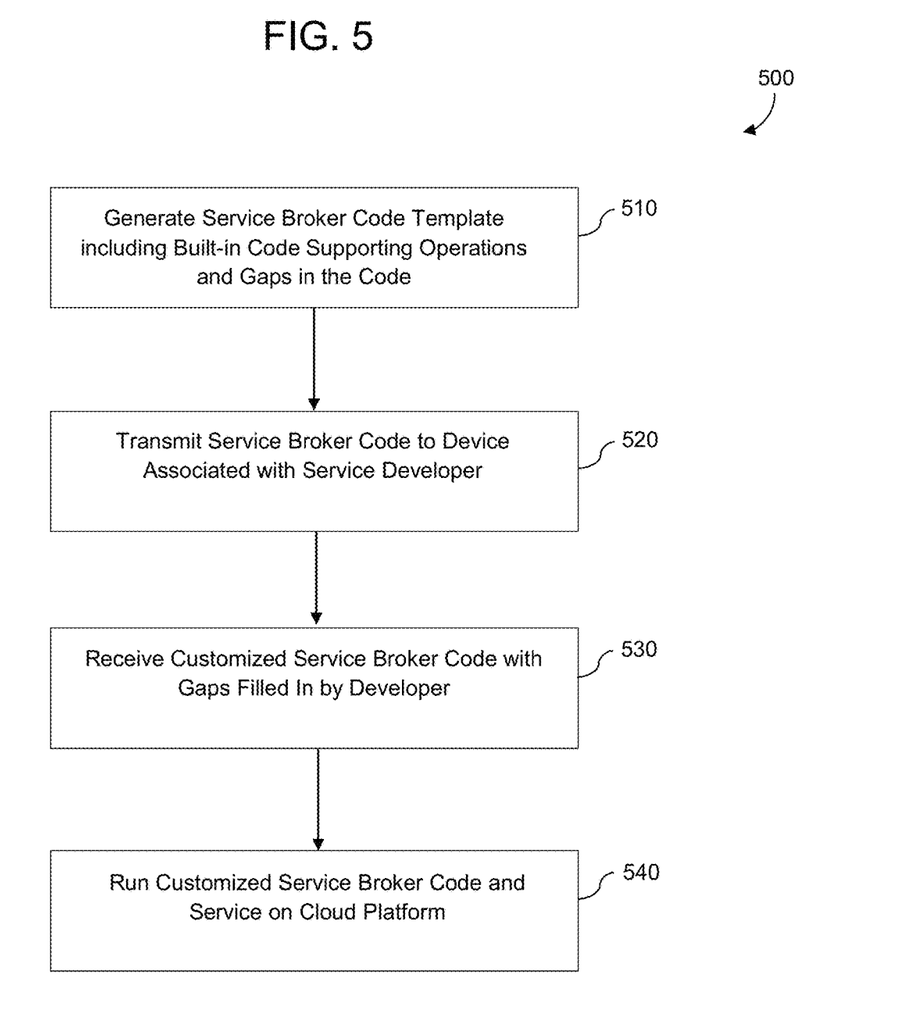
FIG. 5 is a diagram illustrating a method for generating service broker code in accordance with an example embodiment.

FIG. 5 illustrates a method 500 for generating a service broker for a service of a cloud platform in accordance with an example embodiment. For example, the method 500 may be performed by an instance of a cloud platform, a computing device, a combination thereof, and the like. Referring to FIG. 5, in 510 the method includes generating service broker code for a service of the cloud platform. According to various embodiments, the generated service broker code includes built-in code for a plurality of operations performed by the service broker and one or more gaps in the code corresponding to operations performed by the service broker. The gaps are missing built-in code thereby enabling a user to enter their own code for customization of the service broker, for example, by a developer or other party. As merely an example, some of the operations built into the service broker code may include providing a catalog of service offerings, service plan management, a GET endpoint, authentication, and the like. As another example, some of the operations missing from the code may include fine grained access control of endpoints, third party service plan management, POST, PUT, and DELETE endpoints, database deployment, and the like.

In 520, the method includes transmitting the generated service broker code to a user device that is associated with the service, for example, a developer of the service or some other interested user. The service broker code may be filled in to provide code for the one or more missing operations that are the result of the gaps in the initially generated service broker code. In some embodiments, prior to transmitting the code to the user device, the code may be tested to verify that the built in code corresponding to the plurality of operations works properly thereby further benefiting the developer. Furthermore, in addition to transmitting the code in 520, the method may further transmit instructions on how to fill in the one or more missing functions of the service broker code and how to test the service broker code locally. The instructions can facilitate a quicker and more efficient understanding of the service broker code template as well as provide instructions on how to test the service broker code.

In 530, the method further includes receiving customized service broker code from the user device. The customized service broker code may include the previously built-in code that is unchanged along with customized code that has been added to the initial gaps in the code by a user thereby customizing operations corresponding to the missing code. In 540, the method further includes executing the customized service broker code in association with the service. For example, the customized service broker code may be implemented and executed on the cloud platform in association with a service that is also deployed on the cloud platform. Here, a service broker generated by executing the service broker code may be implemented between a cloud controller of the cloud platform and the service corresponding to the service broker.

Figure 6:
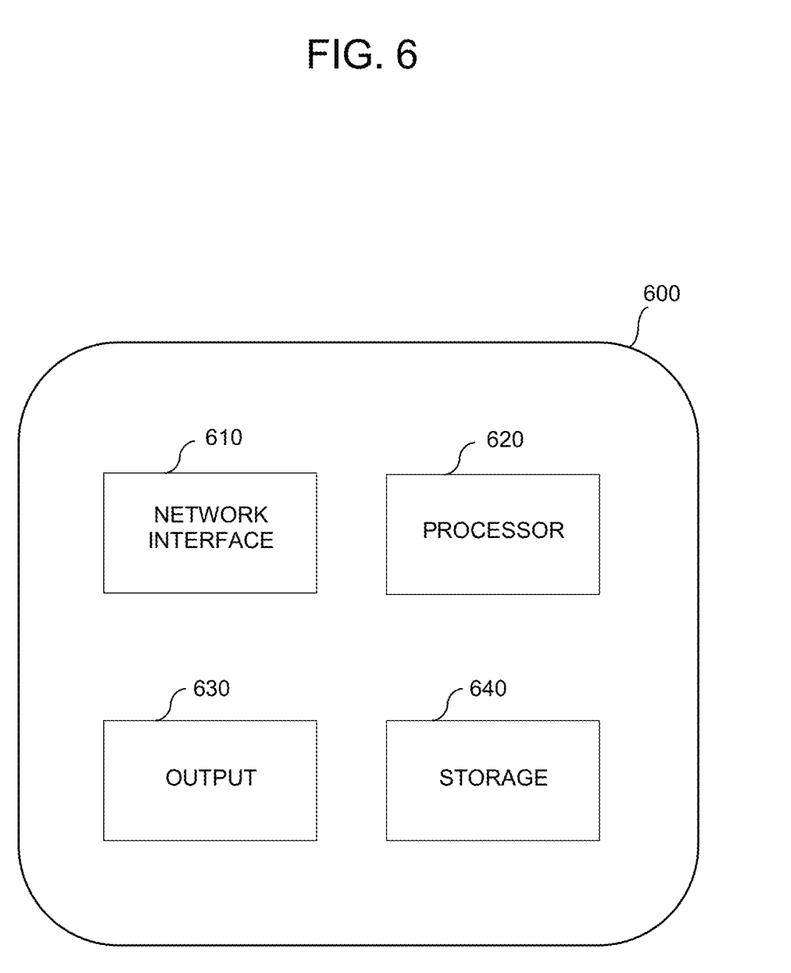
FIG. 6 is a diagram illustrating a device a method for generating service broker code in accordance with an example embodiment.

FIG. 6 illustrates a device 600 for generating service broker code in accordance with an example embodiment. For example, the device 600 may be the cloud computing platform 120 in FIG. 1 (or an instance thereof), or another device. Also, the device 600 may perform the method of FIG. 5. Referring to FIG. 6, the device 600 includes a network interface 610, a processor 620, an output 630, and a storage device 640. Although not shown in FIG. 6, the device 600 may include other components such as a display, an input unit, a receiver, a transmitter, and the like. The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the device 600, an externally connected display, a cloud, another device, and the like. The storage device 640 is not limited to any particular storage device and may include any known memory device such as RAM, ROM, hard disk, and the like.

According to various embodiments, the processor 620 may generate service broker code for a service of a cloud platform. For example, the generated service broker code may include a plurality of operations to be performed by the service broker which are built into the code and one or more operations that are also to be performed by the service broker but that are missing from the code thereby enabling customization of the service broker. As an example, the operations built into the service broker code may include one or more of providing a catalog of service offerings, service plan management, GET endpoints, authentication, and the like, while the one or more missing operations from the service broker code may include at least one of access control of endpoints, third party service plan management, POST, PUT, and DELETE endpoints, database deployment, and the like. In some embodiments, the processor 620 may test the built-in code of the service broker code to verify that the plurality of operations work properly.

The network interface 610 may transmit the generated service broker code to a user device associated with the service thereby enabling a developer to fill-in customized for representing the one or more missing operations. In addition to transmitting the code, the network interface 610 may also transmit instructions on how to fill in the one or more missing functions of the service broker code and how to test the service broker code locally. When the code has been customized, the network interface 610 may receive the customized service broker code from the user device. Here, the customized service broker code may include the built-in code and the customized code for the one or more missing operations.

The processor 620 may execute the customized service broker code in association with the service. A service broker generated by the processor 620 executing the service broker code may be implemented between a cloud controller of the cloud platform and the service corresponding to the service broker. That is, the service broker may act as a middleman between the associated service and the cloud controller of the cloud platform on which the service is deployed. The service broker may control resources of the service that are accessible to users of the cloud platform by controlling communications and resources between the cloud controller and the service.

The embodiments described herein are directed to a service broker code generator that creates a template for a service broker. The template allows even a novice to finalize the development of a service broker in a fraction of the time it takes an expert beginning the code from scratch. The template includes a plurality of operations that have been built therein with gaps in the code that can be filled in by the service developer based on features and requirements of the particular service. The service broker template captures the best practices for service broker development on a cloud platform and also promotes self-learning. In addition to providing the template, the service broker code generator may also provide instructions on how to fill-in and test the template. Accordingly, the service broker template includes verified and reliable code while also allowing a developer to further customize the service broker to their needs.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device for generating a service broker for a service of a cloud platform, the computing device comprising:
a processor configured to generate service broker code for the service of the cloud platform, the generated service broker code comprising built-in code that supports a plurality of operations of the service broker and one or more gaps in the code corresponding to one or more operations of the service broker that are not supported by the built-in code thereby enabling customization of the service broker; and a network interface configured to transmit the generated service broker code to a user device associated with the service for filling in code for the one or more operations that are not supported by the built-in code.

2. The computing device of claim 1, wherein the plurality of operations built into the service broker code comprise one or more of providing a catalog of service offerings, service plan management, GET endpoints, and authentication.

3. The computing device of claim 1, wherein the one or more operations of the service broker that are not supported by the built-in code comprise at least one of access control of end points, third party service plan management, POST, PUT, and DELETE endpoints, and database deployment.

4. The computing device of claim 1, wherein the processor is further configured to test the built-in code included in the service broker code to verify that the plurality of operations work properly prior to transmitting the generated service broker code to the user device.

5. The computing device of claim 1, wherein the network interface is further configured to receive customized service broker code from the user device, the customized service broker code including the built-in code and customized code filling in the one or more gaps and supporting the one or more operations that were not initially supported, and the processor is further configured to execute the customized service broker code in association with the service.

6. The computing device of claim 1, wherein a service broker generated by executing the service broker code communicates with a cloud controller of the cloud platform to reserve resources of the service corresponding to the service broker.

7. The computing device of claim 1, wherein the network interface is further configured to transmit instructions on how to fill in the one or more gaps in the code corresponding to one or more operations of the service broker that are not supported by the built-in code and how to test the service broker code locally.

8. A method for generating a service broker for a service of a cloud platform, the method comprising:

generating service broker code for the service of the cloud platform, the generated service broker code comprising built-in code that supports a plurality of operations of the service broker and one or more gaps in the code corresponding to one or more operations of the service broker that are not supported by the built-in code thereby enabling customization of the service broker; and transmitting the generated service broker code to a user device associated with the service for filling in code for the one or more operations that are not supported by the built-in code.

9. The method of claim 8, wherein the plurality of operations built into the service broker code comprise one or more of providing a catalog of service offerings, service plan management, a GET endpoint, and authentication.

10. The method of claim 8, wherein the one or more operations of the service broker that are not supported by the built-in code comprise at least one of access control of end points, third party service plan management, POST, PUT, and DELETE endpoints, and database deployment.

11. The method of claim 8, further comprising testing the built in code of the service broker code to verify that the plurality of operations work properly prior to transmitting the generated service broker code to the user device.

12. The method of claim 8, further comprising receiving customized service broker code from the user device, the customized service broker code including the built-in code and customized code filling in the one or more gaps and supporting the one or more operations that were not initially supported, and executing the customized service broker code in association with the service.

13. The method of claim 8, wherein a service broker generated by executing the service broker code communicates with a cloud controller of the cloud platform to reserve resources of the service corresponding to the service broker.

14. The method of claim 8, wherein the transmitting further comprises transmitting instructions on how to fill in the one or more gaps in the code corresponding to one or more operations of the service broker that are not supported by the built-in code and how to test the service broker code locally.

15. A non-transitory computer readable medium having stored therein instructions that when executed cause a computer to perform a method for generating a service broker for a service of a cloud platform, the method comprising:

generating service broker code for the service of the cloud platform, the generated service broker code comprising built-in code that supports a plurality of operations of the service broker and one or more gaps in the code corresponding to one or more operations of the service broker that are not supported by the built-in code thereby enabling customization of the service broker; and transmitting the generated service broker code to a user device associated with the service for filling in code for the one or more operations that are not supported by the built-in code.

16. The non-transitory computer readable medium of claim 15, wherein the plurality of operations built into the service broker code comprise one or more of providing a catalog of service offerings, service plan management, a GET endpoint, and authentication.

17. The non-transitory computer readable medium of claim 15, wherein the one or more operations of the service broker that are not supported by the built-in code comprise at least one of access control, third party service plan management, POST, PUT, and DELETE endpoints, and database deployment.

18. The non-transitory computer readable medium of claim 15, wherein the method further comprises testing the built in code of the service broker code to verify that the plurality of operations work properly prior to transmitting the generated service broker code to the user device.

19. The non-transitory computer readable medium of claim 15, wherein a service broker generated by executing the service broker code communicates with a cloud controller of the cloud platform to reserve resources of the service corresponding to the service broker.

20. The non-transitory computer readable medium of claim 15, wherein the transmitting further comprises transmitting instructions on how to fill in the one or more gaps in the code corresponding to one or more operations of the service broker that are not supported by the built-in code and how to test the service broker code locally.

* * * * *